United States Patent
Murphy et al.

(10) Patent No.: US 8,410,895 B2
(45) Date of Patent: *Apr. 2, 2013

(54) REMOTE CONTROL AND MONITORING OF BARRIER OPERATORS WITH RADIO FREQUENCY TRANSCEIVERS

(75) Inventors: Larry D. Murphy, North Canton, OH (US); Brian M. Yackey, Akron, OH (US); Grant B. Carlson, Hammondsport, NY (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,970

(22) Filed: Jun. 3, 2011

(65) Prior Publication Data

US 2011/0234367 A1 Sep. 29, 2011

Related U.S. Application Data

(63) Continuation of application No. 11/301,584, filed on Dec. 13, 2005, now Pat. No. 7,956,718.

(60) Provisional application No. 60/636,513, filed on Dec. 16, 2004.

(51) Int. Cl.
*G05B 23/02* (2006.01)

(52) U.S. Cl. .......................................................... 340/3.1

(58) Field of Classification Search ................. 340/5.71, 340/3.1, 5.61, 5.64
See application file for complete search history.

(56) References Cited

U.S. PATENT DOCUMENTS

| | | | |
|---|---|---|---|
| 5,191,268 A | 3/1993 | Duhame | |
| 5,493,812 A | 2/1996 | Teich | |
| 5,596,840 A | 1/1997 | Teich | |
| 5,798,681 A | 8/1998 | Chang | |
| 5,883,579 A | 3/1999 | Schreiner et al. | |
| 5,969,637 A | 10/1999 | Doppelt et al. | |
| 6,166,634 A | 12/2000 | Dean | |
| 6,184,787 B1 | 2/2001 | Morris | |
| 6,346,889 B1 | 2/2002 | Moss | |
| 6,388,559 B1 | 5/2002 | Cohen | |
| 6,469,464 B1 | 10/2002 | McCall | |
| 6,553,238 B1 | 4/2003 | Ginzel et al. | |
| 6,563,278 B2 | 5/2003 | Roman | |
| 6,597,291 B2 | 7/2003 | Tsui | |
| 6,608,399 B2 | 8/2003 | McConnell et al. | |
| 6,615,132 B1 | 9/2003 | Nagasaka et al. | |
| 6,624,605 B1 | 9/2003 | Powder et al. | |
| 6,634,408 B2 | 10/2003 | Mays | |
| 6,759,942 B2 | 7/2004 | Bedi et al. | |
| 7,119,673 B2 | 10/2006 | Eager et al. | |
| 7,956,718 B2 * | 6/2011 | Murphy et al. ................ | 340/3.1 |
| 2001/0017483 A1 | 8/2001 | Frohberg | |
| 2004/0239482 A1 | 12/2004 | Fitzgibbon | |
| 2004/0239496 A1 | 12/2004 | Fitzgibbon | |
| 2005/0012631 A1 | 1/2005 | Gregori et al. | |

\* cited by examiner

*Primary Examiner* — Vernal Brown
(74) *Attorney, Agent, or Firm* — Gardere Wynne Sewell LLP

(57) ABSTRACT

Low cost, low power consumption radio frequency transceivers are incorporated in barrier operator control systems for transmitting signals between an operator control unit, one or more remote control units, a diagnostic or calibration device and an obstruction detector. Similar detector devices, including such transceivers, may be employed in loading docks for detecting the status of dock levelers and vehicle restraint devices. Radio frequency communication eliminates the need for hard wiring and also provides for transmission of commands and status information between various control units.

24 Claims, 4 Drawing Sheets

REMOTE CONTROL AND MONITORING OF BARRIER OPERATORS WITH RADIO FREQUENCY TRANSCEIVERS

CROSS-REFERENCE TO RELATED APPLICATIONS

This application is a continuation of U.S. patent application Ser. No. 11/301,584, entitled "Remote Control and Monitoring of Barrier Operators with Radio Frequency Transceivers," filed Dec. 13, 2005, which claims the benefit of Provisional Patent Application No. 60/636,513, filed Dec. 16, 2004, the disclosures of all of which are hereby incorporated by reference.

BACKGROUND OF THE INVENTION

Barrier operators, such as upward acting sectional garage doors, so-called rollup doors and similar motor operated barriers, are known which are operated by remote control using battery powered remote control units with radio frequency (RF) transmitters and receivers, for example, which control units exchange commands and information with a transmitter and receiver associated with an operator base control unit. The development of commercially available, miniature, combination radio frequency (RF) transmitter and receiver (transceiver) devices which are capable of transmitting and receiving substantial amounts of information has made possible, or at least advantageous, the ability to transmit information regarding the status of a barrier, such as a garage door or the like.

For example, the remote control unit carried in a motor vehicle for operating a garage door desirably should include at least an indicator whereby the user can determine whether or not the door is in an open position, a closed position or moving between such positions. Low power, radio frequency transceivers may also be incorporated in wall mounted console units or other remote control devices for monitoring a barrier or door status and for issuing commands to move the barrier or door between open and closed positions. Such devices would eliminate the need to provide hard wiring between the door operator head or enclosure and the console unit or other type of remote control unit.

Still further, low power consumption radio frequency transceivers of the type discussed herein would also be advantageous for use in conjunction with a wireless local area network (WLAN) which would make possible the transmission of substantial amounts of information in addition to the status and control of a barrier or garage door, and have such additional information relayed over great distances to and from a variety of wireless devices.

The use of miniature, low power consuming RF transceivers in the art of barrier operators and the like could, desirably, also include an arrangement wherein a transceiver may communicate an obstruction signal from an obstruction sensor or the like to the barrier operator to either cause the barrier to move to an open position or at least arrest movement of the barrier toward a closed position. The information communication capability of miniature low power consuming transceivers could also facilitate operation of door operator diagnostic and setup devices to be capable of communicating with an operator controller to establish operator control limits, monitor the overall health of the operator and monitor or establish related control and information parameters. Such transceivers could also, advantageously, be used in conjunction with other systems or equipment, such as dock levelers and vehicle restraint devices used in commercial loading docks and the like.

Accordingly, there has been a strongly felt need for further developments in the art of barrier operators and the like wherein information and commands may be communicated between an operator base controller and remote control and monitoring devices. It is to these ends that the present invention has been developed.

SUMMARY OF THE INVENTION

The present invention provides an improved barrier operator control system which includes a radio frequency (RF) transmitter/receiver, commonly referred to as a transceiver, which may be located at an operator base or head unit, the head unit including a base controller and motor, and included in one or more remote control units including units adapted for placement in a motor vehicle, as well as units adapted for disposition as a control console disposed in various locations, including being mounted on an inside or outside wall of the structure at which the barrier is disposed.

Still further, the invention contemplates the provision of a low power consumption RF transceiver mounted on an outside wall of a structure at which a barrier, such as a garage door, is disposed and which is operable to detect the door or barrier status (i.e., position) and communicate a signal to a transceiver that may be located in a vehicle, or is otherwise located such that it may be monitored by maintenance, security or service personnel.

The present invention further contemplates a system wherein a barrier operator includes a transceiver which communicates the status of the barrier (open, closed or moving) to a security or household convenience or control system.

Still further, the invention contemplates the provision of an RF transceiver placed a relatively short distance from a barrier operator system, such as on an outside wall of a building at which the barrier is disposed, and which may relay information between a transceiver associated directly with the barrier operator unit and remote control units, such as the type typically placed in motor vehicles for remote control operation of the barrier.

The present invention still further contemplates the provision of a low power consumption radio transceiver mounted on or directly associated with a garage or building entrapment protection device to minimize the chance of a barrier undergoing unwanted opening or closing actions.

The invention still further contemplates the provision of an RF transceiver mounted at or connected directly to a barrier operator unit or base controller and operable to communicate with a transceiver associated with a diagnostic or operator setup module.

The invention yet further contemplates the provision of one or more radio transceivers mounted for sensing the operation of dock equipment, such as dock levelers and vehicle restraint devices, so that the status of such equipment may be monitored for compliance with control commands and to determine the status of the equipment with respect to vehicle movements to and from a loading dock.

Those skilled in the art will further appreciate the abovementioned advantages and superior features of the invention, together with other important aspects thereof upon reading the detailed description which follows in conjunction with the drawings.

DETAILED DESCRIPTION OF THE PREFERRED EMBODIMENTS

Figure 1:
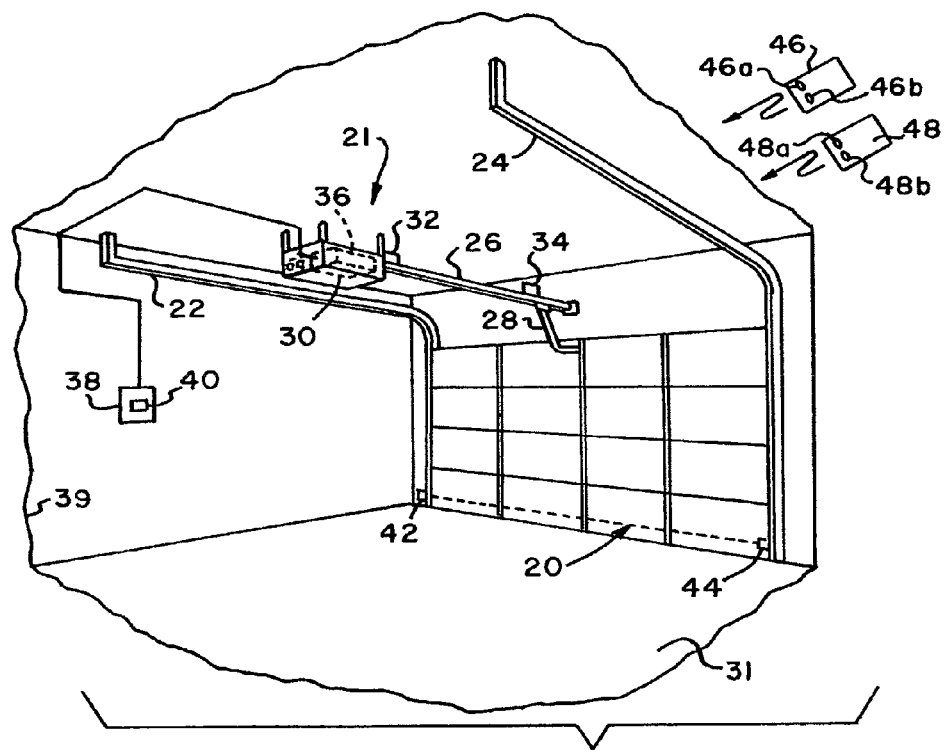
FIG. 1 is perspective view in somewhat schematic form of a barrier operator provided with RF transceiver equipment for communicating commands and status of the barrier in accordance with the present invention.

In the description which follows like elements are marked throughout the specification and drawing with the same reference numerals, respectively. The drawing figures are not necessarily to scale and certain elements are shown in generalized or schematic form in the interest of clarity and conciseness.

Referring to FIG. 1, there is illustrated a conventional sectional upward acting garage door 20 movable between open and closed positions on conventional guidetracks 22 and 24. The garage door 20 is representative of many types of barriers that may enjoy the benefits of the present invention including so-called rollup doors, gates and other barrier devices. However, certain embodiments of the present invention are particularly advantageously used in conjunction with residential and commercial remote controlled garage doors. The barrier or door 20 is operable to be moved between the closed position shown and an open position by an operator generally designated by the numeral 21, which may take various forms but typically includes an elongated support rail for supporting a mechanism, not shown, connected to an arm 28, which mechanism is operable to be driven by a motor mounted in an operator head unit or enclosure 30. Control of the aforementioned motor may include response to movement of the door and the arm 28 between limit switches 32 and 34 mounted on the rail 26. Other types of limit devices, including so-called electronic limits, may be employed with the invention. The operator 21 includes a base controller 36 mounted in the head unit 30 and responsive to signals from a wall console unit 38 which may include a momentary or push button type switch 40 for operating the door 20 to move between open and closed positions. Wall console unit 38 may be mounted on wall 39 inside a building 39a at which door 20 is disposed in accordance with conventional practice. Wall console 38 may be hard wired to the controller 36 or may advantageously communicate with the controller by radio frequency signals as will be described further herein.

The operator 21 may also be controlled by remote control units 46 and 48, FIG. 1, which include respective push button type control switches 46a, 46b, 48a and 48b for remotely controlling movement of the door 20 from an open position to a closed position and vice versa.

Figure 2:
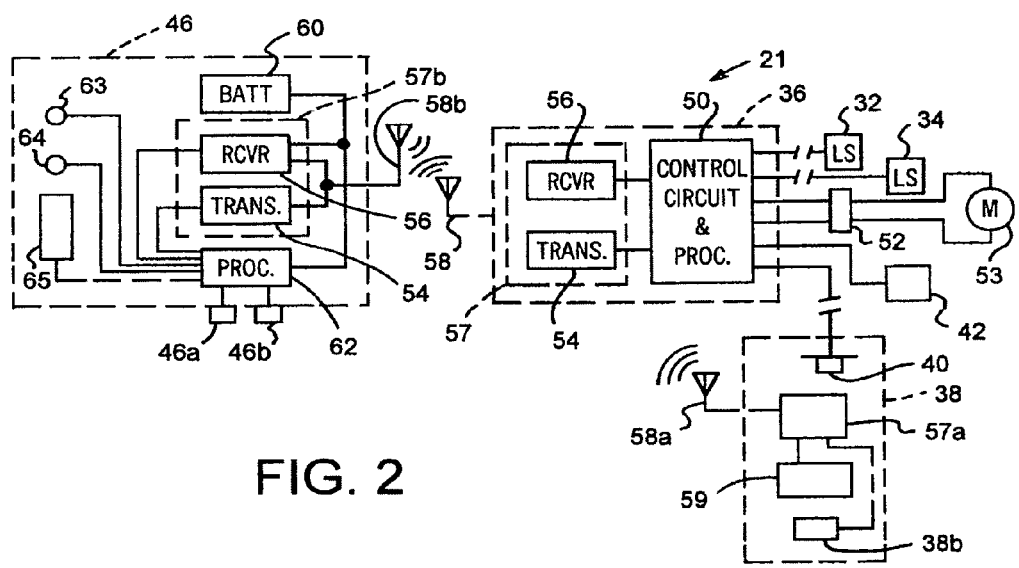
FIG. 2 is a schematic diagram of a system of the type described above with respect to FIG. 1.

Referring to FIG. 2, the controller 36 is shown in greater detail, as well as the wall console 38 and the remote control unit 46. The remote control unit 48 is essentially identical to the unit 46. Controller 36 includes a radio frequency transmitter 54 and receiver 56, respectively, which are shown as separate units but which may be integrated and characterized as a transceiver 57 having a controller operated transmit and receive switch, not shown, and a single antenna 58, as shown. Low power consumption, inexpensive radio frequency transceivers of the type described are commercially available which operate in the 315 MHZ and 915 MHZ frequency bands, for example, and may be of a type typically associated with so-called cellular telephones also. Transceiver 57 is operably connected to a control circuit and microprocessor or microcontroller 50. Microprocessor and control circuit 50 is also operably connected to limit switches 32 and 34 and to a motor 53 controlled by a motor control circuit 52. Motor 53 is operable to provide motive power for moving the door 20 between open and closed positions. Control circuit and processor 50 may also be operably connected to an obstruction detector 42 of a type which may be disposed in proximity to the floor 31 of the building 39a at which the door 20 is disposed, see FIG. 1. Obstruction detector 42 may be of a type which transmits a beam to a sensor or reflector device 44 comprising part of and disposed opposite the beam transmitter and receiver unit of detector 42. The detector 42, 44 may take various forms but may, for example, include an infrared emitter and sensor which emits a beam which is reflected back by element 44 and which, when interrupted, gives a signal to the controller 36 to either stop the door 20, if moving to an open position, or stop and reverse movement of the door if moving toward a closed position in accordance with known control systems for barriers, such as upward acting doors. Electrical power for operator 21 may be provided by the power system for building 39a.

In accordance with the present invention, wall console 38, which includes manually actuatable switch 40, also includes a transceiver 57a, FIG. 2, essentially identical to transceiver 57, and connected to an antenna 58a for communicating radio frequency (RF) signals between transceiver 57a and transceiver 57. Wall console 38 may also include a control circuit and visual display 59 associated therewith for displaying the status of the door 20. This is particularly advantageous if wall console 38 is disposed remote in another room other than the garage structure illustrated in FIG. 1, for example. In fact, visual display 59 may, for example, be associated with a security control system console, not shown, associated with the building 39a at which the barrier 20 is disposed for monitoring all portals and other systems associated with the building. Wall console 38 may receive electrical power from controller 36 or from an onboard battery 38b, FIG. 2.

Referring further to FIG. 2, the remote control unit 46 includes a radio frequency transceiver 57b essentially identical to the transceivers 57 and 57a and including a transmitter circuit 54 and a receiver circuit 56. Transceiver 57b is operably connected to an antenna 58b for receiving and transmitting signals between control unit 46 and controller 36 and/or wall console 38. Power for operating transceiver 57b may be supplied by a suitable battery 60 and signals received from and generated by transceiver 57b may be processed by a microcontroller 62. Barrier status may be displayed by way of suitable visual indicators 63 and 64 and/or by way of a text message displayed on a suitable visual display 65 to indicate the status of the barrier such as open, closed, moving closed, moving open, or obstruction detected, for example.

Accordingly, the system illustrated in FIGS. 1 and 2 advantageously provides for placing an RF transceiver in the operator head or enclosure 30 and operably connected to a base controller, in a wall console unit 38 and in one or more remote control units, such as the remote control units 46 and 48. When the barrier 20 is moved by the operator 21 to its closed position, for example, a signal may be sent from controller 36, via transceiver 57 to both wall console 38 and one or more remote control units, such as the unit 46, indicating the door 20 is closed. Such indication may be by way of illuminating a green visual indicator 63, for example. However, if the operator 21 has been commanded to close the door 20 by the remote control unit 46 or the wall console 38 and such does not occur, that is, a door closed signal is not transmitted to the transceiver 57 and then to the transceivers 57a and 57b, a red visual indicator 64 may be illuminated. Alternatively, or in addition, visual indications may be displayed on the displays 59 and 65 or an audible signal may be generated by the units 46 and/or 38.

Figure 3:
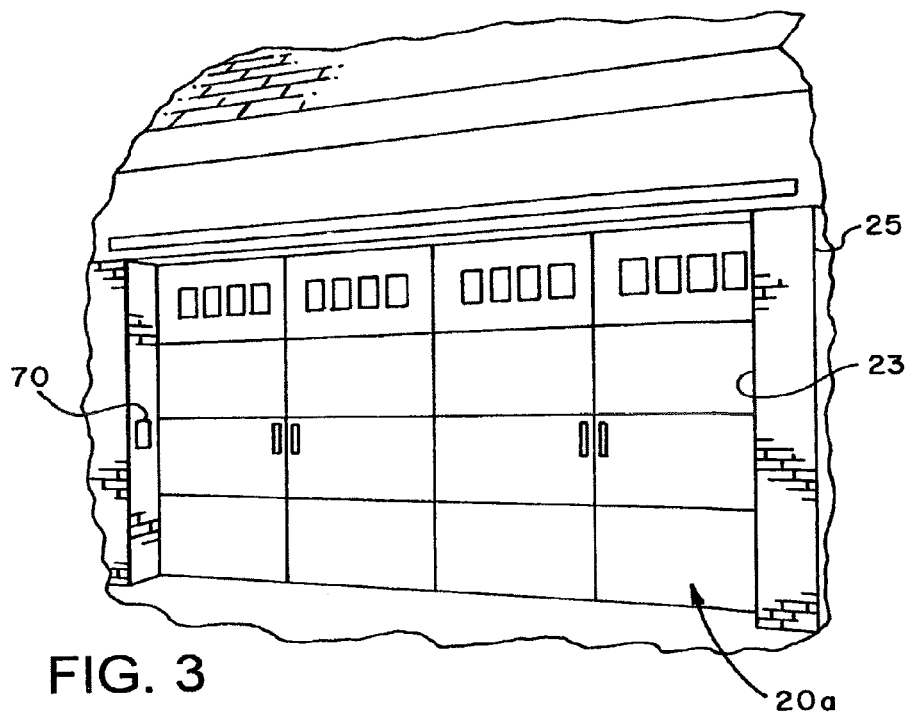
FIG. 3 is a perspective view of a barrier which includes an externally mounted barrier status RF transceiver for communicating information to a remote control unit and to an operator unit.

Referring now to FIG. 3, a barrier 20a similar in most respects to the barrier 20, is illustrated in a closed position with respect to a doorway or opening 23 in a building 25. Barrier 20a is operable to be moved between an open and closed position with an operator 21, not shown in FIG. 3. However, in FIG. 3, there is illustrated a barrier status detector unit 70, which may include suitable means for sensing the position of the door 20a. For example, the detector unit 70 may include a magnetic or Hall effect type sensor, or a photoelectric type sensor, including an infrared emitter and receiver device, for determining if the door or barrier 20a is in a closed position, moving in one direction or the other, or in an open position. Position or status detector unit 70 includes a transceiver 57c, FIG. 4, essentially identical to the transceivers 57, 57a and 57b and operably connected to a circuit 72 which includes the aforementioned sensor 73 of one type or another for detecting the position and, possibly, movement of door 20a. Accordingly, unit 70 is operable for transmitting suitable signals to a remote control unit 46 as well as to the operator controller 36, as shown. Transceiver 57c is operable to send and receive signals via an antenna 58c. The unit 70 may also comprise a so-called wireless, keyless control unit to provide for operation to open and close barrier 20a by a person physically addressing the unit. An example of an improved wireless, keyless control unit is disclosed in U.S. Patent Application Publication No. US2005/0151622A1, to McMahon, and assigned to the assignee of the present invention.

Figure 4:
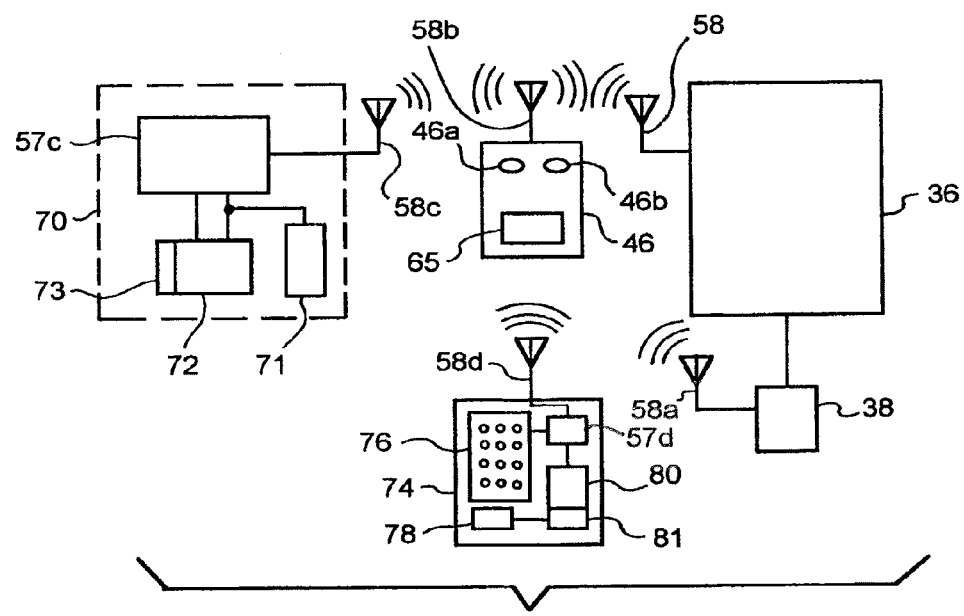
FIG. 4 is a schematic diagram showing the components of a system which includes a remote sensing or monitoring transceiver, a remote control unit, a base or operator mounted control unit and a diagnostic or calibration module, all operable to communicate with each other by radio frequency signals.

FIG. 4 also illustrates a remote diagnostic or calibration unit 74 which may communicate with the controller 36, in particular, by way of an RF transceiver 57d essentially like the transceivers previously described herein. Signals may be transmitted and received via an antenna 58d. A suitable keypad 76, a power source comprising a battery 78, and a microprocessor 80 may be associated with the diagnostic or calibration unit 74 and a visual display 81 may be provided for use in diagnosing operating characteristics and status of the controller 36 and for setting operating parameters of the operator 21. Diagnostic information may also be received by the diagnostic/calibration unit 74 from the status detector unit 70 and the remote control units 46 and 48, for example. Accordingly, the system illustrated in FIGS. 3 and 4 provides for detecting the status of a barrier, such as the door 20a, and displaying such status at a remote control unit 46, at a wall console 38 associated with controller 36 and at a diagnostic or calibration device 74.

Under certain circumstances the signal strength of the operator controller 36 and its associated transceiver 57 may not be sufficient to reach remote control units 46 and/or 48 outside of a certain range of the building at which the controller 36 is disposed. In such situations, the transceiver 57c may be adapted to receive information from the transceiver 57 associated with controller 36 as regards the status of the operator 21 and the barrier 20 or 20a and for relaying such information to and from the transceiver 57b of remote control unit 46 and/or 48, for example. Accordingly, the invention also contemplates a system where a transceiver is associated with the door operator controller 36, such as the transceiver 57, and a transceiver 57c, for example, acting as a relay or repeater is placed in a suitable location, generally outside a building at which the barrier is disposed, for transmitting information back and forth between a remote control unit 46 or 48 and the controller 36.

Figure 5:
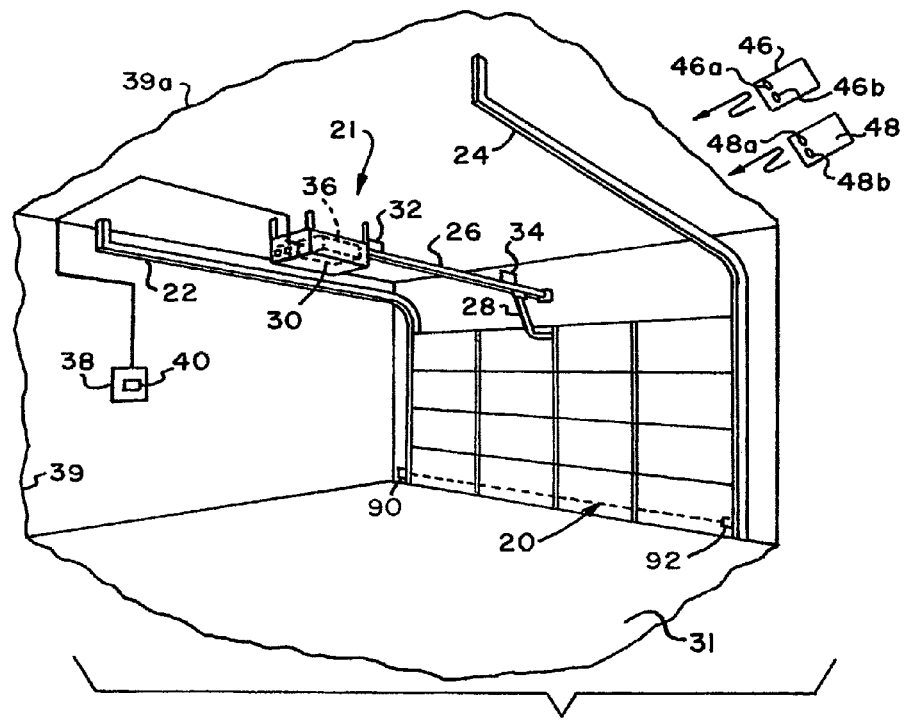
FIG. 5 is a view similar to FIG. 1 showing an arrangement of an external entrapment system associated with a barrier operator and operable to transmit RF signals to the barrier controller.
Figure 6:
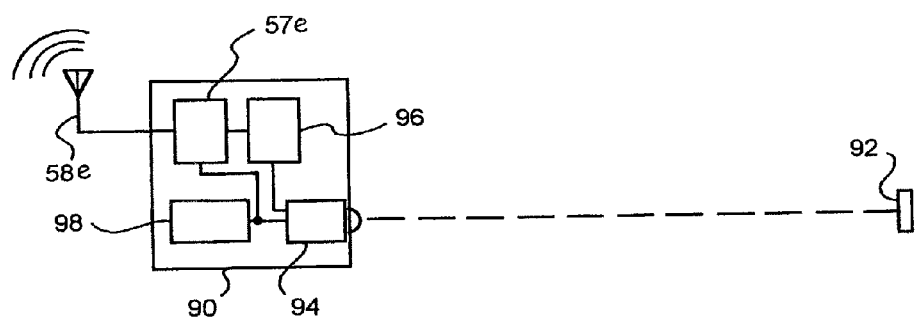
FIG. 6 is a detail schematic view of the external entrapment or obstruction detector illustrated in FIG. 5.

Referring now to FIGS. 5 and 6, another embodiment of the invention contemplates use of the operator 21, the controller 36 and the wall console 38 in conjunction with an obstruction detector 90 in place of the obstruction detector 42, 44. The obstruction detector 90 may be of a type which is operable to detect the presence of an obstruction in the doorway closable by the door 20. For example, the obstruction detector 90 may emit an optical signal which may be reflected off of a suitable device 92, which may be a reflector or sensor. As shown in FIG. 6, obstruction detector 90 includes a suitable optical or infrared emitter and receiver 94 which transmits a beam to be reflected off of reflector or sensor 92. Other forms of beam break or obstacle detection sensors may be employed which are operable to provide a signal to a processor 96 which is in communication with a transceiver 57e essentially identical to transceiver 57 and connected to an antenna 58e. Power for operating the sensor 94 and the processor 96 is provided by a battery 98. Processor 96 is responsive to a signal from a diagnostic or calibration device 74, operator controller 36, wall console 38, or one of the remote control units 46 to turn on the sensor 94 when a change in state of the door 20 is about to occur, such as if the door is moving toward a closed position. Accordingly, power consumption by the obstruction detector unit 90 is normally very low, only that necessary to allow the transceiver 57e to receive a signal from any one of the aforementioned transceivers 57, 57a, 57b, 57c, or 57d. However, once the signal is received, the detector 94 is energized, or transitioned to a power consumption mode. At all other times the sensor 94 may be deenergized to prolong sensor life and conserve battery power.

One advantage of the obstruction detector 90 is that, since communication between the operator controller 36 and the detector 90 is by way of radio frequency (RF) or wireless signals, hard wiring between the controller and the obstruction detector is eliminated. Of course, if the sensor 94 detects an obstruction in the doorway while it is energized that information is communicated via the processor or microcontroller 96 and the transceiver 57e to the controller 36 to display related information and to prevent the door from closing on the obstruction detected. If the detector 90 is located so far away from the controller 36 as to not ensure adequate signal transmission between transceivers 57e and 57, a unit such as detector 70 or merely a repeater transceiver, such as transceiver 57c, may be placed in a position to ensure relay of information between obstruction detector 90 and controller 36 as well as, possibly, remote control units 46 and 48. In this regard a transceiver or detector unit 70 may be employed and placed outside the garage or building employing the system of FIGS. 5 and 6, for example, or in another location which will ensure adequate signal transmission between all units of the system.

Figure 7:
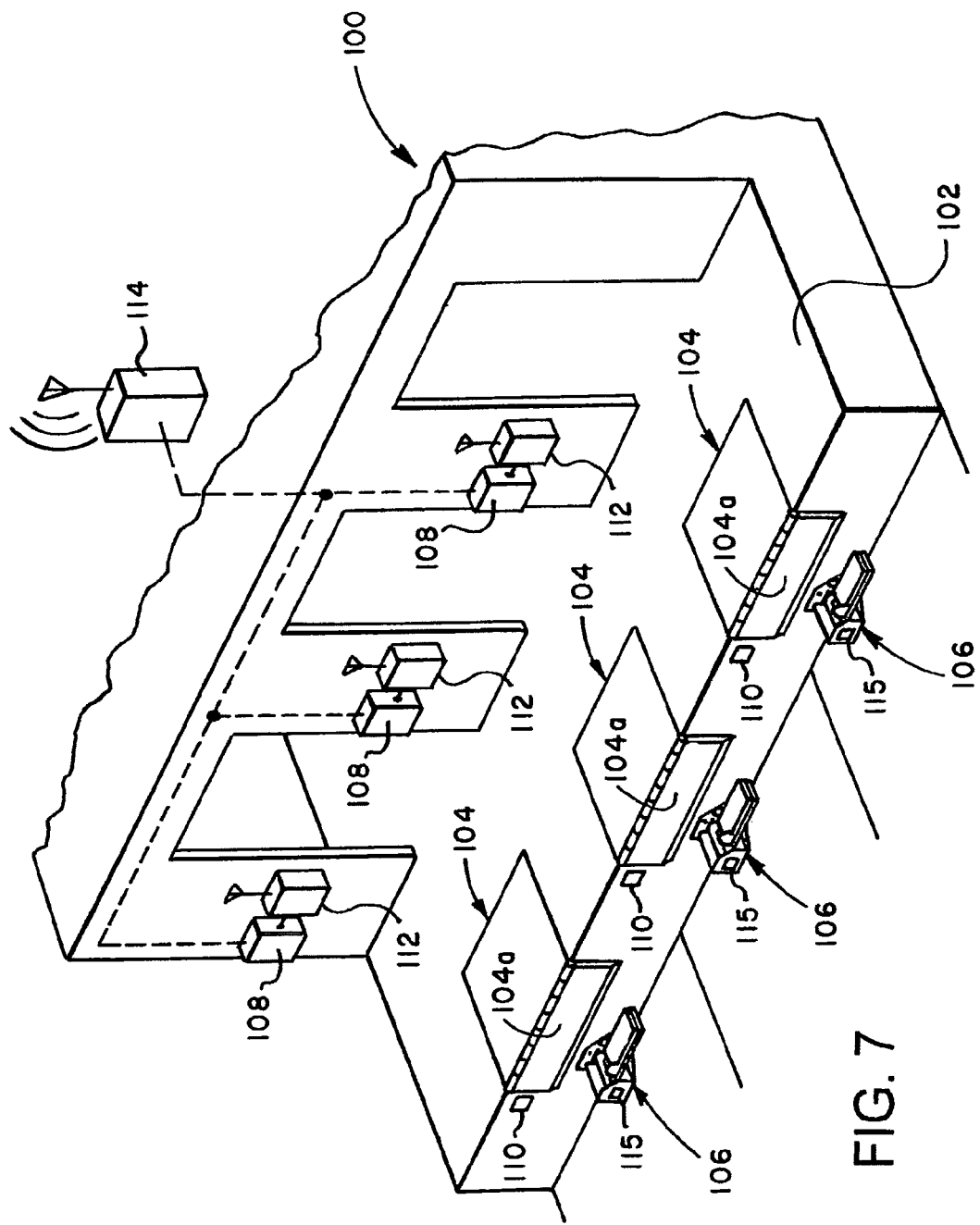
FIG. 7 is a somewhat schematic perspective view of a loading dock illustrating plural dock levelers and vehicle restraints which are operable to communicate with a control system via RF transceiver devices.

Referring now to FIG. 7, there is illustrated a freight loading dock 100 including a dock floor 102 at which plural dock leveler devices 104 are disposed. Dock leveler devices 104 may be of a type commercially available, such as from W. B. McGuire Company, a unit of the assignee of the present invention. Commercial freight loading docks for transferring freight to and from motor trucks, also typically include so-called truck restraint devices 106, as illustrated, for restraining a truck or trailer body from movement away from the dock 102 during freight loading and unloading operations. Typically, movement of the dock leveler 104 and the vehicle restraint 106 between working and nonworking positions is carried out by operation of a control unit 108 for operating suitable motor means to move the dock leveler and the vehicle restraint between the working and nonworking positions and to display the status of these devices. The dock levelers 104 may each have suitable status detector units 110 mounted in proximity thereto, respectively, for transmitting radio frequency signals to a transceiver and control unit 112 associated with each dock equipment control unit 108. The status detectors 110, which may be substantially similar to the detectors 90, are operable for detecting the position of the dock leveler 104, including a leveler lip 104a, for example. Accordingly, a transceiver associated with each of the detector units 110 is operable to transmit signals to the control units 112 whereby dock operating personnel would be able to detect the status of the dock equipment associated with each control unit. Alternatively, or in addition, a master control unit 114 may be operably connected to the control units 108 and also include a transceiver similar to the transceivers 57, 57a, 57b, 57c, 57d or 57e for ascertaining the status of each of the dock levelers 104 by way of signals transmitted thereto directly from the detector units 110.

Referring further to FIG. 7, detector units 115 may also be associated with each vehicle restraint 106 and include suitable detector means for determining the position of the vehicle restraint for transmitting information regarding same to the control units 112 and/or 114. In this way low cost, low power consumption devices may be associated with dock loading equipment, such as dock levelers and truck restraints, to provide information to a control system as to the status of such equipment so that vehicles arriving and leaving a loading dock may do so without damage to the vehicle and/or the loading dock and its equipment. As with the detector unit 90, the devices or units 110 and 115 may include detector or sensor devices which may be maintained in a low power or no power consumption status until a signal is provided to change the state of the device, which may occur when one of the devices 104 or 106 is moved toward or from a stored position for example.

The control units 36, 38, 46, 48, 70, 74, 90, 112, 114 and 115 may communicate by way of so-called half duplex communication by sending and receiving simple packet data. Keelog type encoded signals may be sent inside small packets, if needed. Operation is generally fixed frequency in one of about twenty channels in the 315 MHZ or 915 MHZ frequency bands. Bidirectional range is indicated to be approximately one thousand feet out of doors in the 915 MHZ band and about two hundred feet out of doors in the 315 MHZ band. Bidirectional range transmitting direct through a steel door or similar barrier is indicated to be about four hundred feet in the 915 MHZ band and seventy-five feet in the 315 MHZ band. Transmitter power at 915 MHZ is indicated to be about 94 dBuV/m at three meters, however, regulations allow power up to about 114 dBuV/m. Power at 315 MHZ is limited by regulations to 84 BuV/m at three meters.

As mentioned previously, the control units of the present invention may be implemented in a local communication network sending data packets, half duplex, enabled by the transceivers. The transmission protocol may utilize one or more commercially available systems, such as systems implemented under the trade names Blue Tooth, WIFI and ZigBee. The control system of the present invention could utilize any one of the above-mentioned protocols or a similar protocol. In each case, however, the wireless devices described herein send data packets and then receive confirmation signals, also referred to as ACKS, as part of the bidirectional nature of the system. The transceivers described herein, such as the transceivers 57, 57a, 57b, 57c, 57d and 57e may be of a type commercially available from Freescale Semiconductor, Inc., Austin, Tex., for example.

Although preferred embodiments of the invention have been described in detail herein, those skilled in the art will recognize that various substitutions and modifications may be made without departing from the scope and spirit of the appended claims.

What is claimed is:

1. In a barrier operator system for moving a barrier between open and closed positions, a motor operably connected to drive said barrier, a base controller operably connected to said motor and operable to receive signals from barrier position limit detection means, and at least one remote control unit operable for wireless communication with said base controller, the improvement characterized by:
   said base controller including an RF base transceiver and said at least one remote control unit including an RF remote transceiver operable to communicate with said base transceiver, said remote control unit including status indicator means operable to indicate a status of said barrier in response to receiving signals from said base transceiver;
   an obstruction detector including a detector transceiver operable to communicate obstruction detection signals to at least one of said base transceiver and said remote transceiver; and
   a power controller operable to switch a power consumption mode of said obstruction detector;
   wherein said detector transceiver is operable to receive wireless control signals and is further operable to activate said power controller upon receipt of said wireless control signals.

2. The system set forth in claim 1 wherein:
   said wireless control signals are received from at least one of said base transceiver, said remote transceiver, a wall mountable remote control unit transceiver, a barrier status detector transceiver, or a diagnostic and calibration control unit transceiver.

3. The system set forth in claim 1 wherein:
   said status indicator means includes at least one visual indicator.

4. The system set forth in claim 3 wherein:
   said visual indicator includes a first visual indicator for indicating that said barrier is one of open, opening and obstruction detected and a second visual indicator for indicating that said barrier is closed.

5. The system set forth in claim 3 wherein:
   said visual indicator includes a display for displaying a signal indicating said status of said barrier.

6. The system set forth in claim 1 wherein:
   said at least one remote control unit includes control switch means for causing a signal to be transmitted from said remote transceiver to said base transceiver for commanding a change of state of said barrier.

7. The system set forth in claim 1 including:
a wall mountable remote control unit including a transceiver for communicating RF signals between said base transceiver and said wall mountable control unit, and a control switch associated with said wall mountable control unit for commanding said base controller to change the state of said barrier.

8. The system set forth in claim 1 including:
said obstruction detector detecting an obstruction in a path through which said barrier may move from an open position to a closed position, said obstruction detector including a detector transceiver for communicating RF signals to at least one of said remote transceiver and said base transceiver indicating the detection of an obstruction in said path.

9. The system set forth in claim 1 including:
a barrier status detector including a transceiver for relaying signals between said base transceiver and said remote transceiver.

10. The system set forth in claim 1 including:
a diagnostic and calibration control unit including a transceiver operable to communicate with at least one of said base transceiver, said remote transceiver, a transceiver of a wall mountable control unit and said detector transceiver.

11. The system set forth in claim 1 wherein:
said base transceiver is operable to communicate with one or more of said remote transceiver, said detector transceiver, and a relay transceiver, over a local communication network by transmitting between said transceivers data packets, half duplex and enabled by said transceivers.

12. The system set forth in claim 1, wherein said status of said barrier includes one of open, opening, closed, closing, or obstruction detected.

13. The system set forth in claim 1, wherein said power controller is operable to switch said power consumption mode between a higher power consumption mode and a lower power consumption mode.

14. In a movable barrier operator system including a base controller having a radio frequency base transceiver and a remote control unit for controlling movement of said barrier, said remote control unit including a radio frequency remote transceiver operable to communicate with said base transceiver, a method including the steps of:
communicating a wireless control signal from said remote transceiver to said base transceiver instructing said operator system to change the state of said barrier by either one of opening said barrier or closing said barrier;
said base transceiver, upon receiving said wireless control signal, causing said base controller to either open or close said barrier;
transmitting a wireless status signal from said base transceiver to said remote transceiver indicating a change of state of said barrier; and
causing said remote control unit to provide a signal to alert a user thereof as to a status of said barrier.

15. The method set forth in claim 14 wherein:
said transceivers are operable for communicating signals in packets of data by way of a wireless local area network.

16. The method set forth in claim 15 wherein:
said wireless local area network is connected wirelessly to selected other remote networks to transmit the status of said barrier through said other networks.

17. The method set forth in claim 14, further comprising:
communicating a wireless control signal to an obstruction detector transceiver; and
energizing said obstruction detector from a power consumption mode to a higher power consumption mode upon receipt of said wireless control signal.

18. The method set forth in claim 17 wherein:
said wireless control signal is communicated from at least one of said base transceiver, said remote transceiver, a wall mountable remote control unit transceiver, a barrier status detector transceiver, or a diagnostic and calibration control unit transceiver.

19. In a barrier operator system for moving a barrier between open and closed positions, the system comprising a motor operably connected to drive said barrier, a base controller operably connected to said motor and operable to receive signals from barrier position limit detection means, at least one remote control unit operable for wireless communication with said base controller, at least one of a barrier status indicating unit and an obstruction detection unit operable for wireless communication with at least one of said base controller and said at least one remote control unit;
said base controller including an RF base transceiver, said at least one remote control unit including an RF remote transceiver, said at least one of said barrier status indicating unit and obstruction detection unit including an RF transceiver;
said transceivers being operable to transmit status signals to at least one of said base transceiver and said remote transceiver indicating a status of said barrier;
said remote control unit including signal means for generating a status signal in response to transmissions from at least one of said base transceiver, said transceiver of said status indicating unit, and said obstruction detection unit; and
said obstruction detection unit including control means for changing a power consumption mode of the obstruction detection unit in response to receiving a status signal.

20. The system set forth in claim 19 wherein:
said status signal is received from at least one of said base transceiver, said remote transceiver, said barrier status indicating unit transceiver, a wall mountable remote control unit transceiver, or a diagnostic and calibration control unit transceiver.

21. The system set forth in claim 19 wherein:
transmissions between said transceivers are carried out over a communication network between said transceivers, said transceivers transmitting information via data packets in a half duplex mode enabled by said transceivers.

22. The system set forth in claim 19 including:
a diagnostic and calibration control unit, including a transceiver for communicating with at least one of said base transceiver, said remote transceiver, said barrier status transceiver and said obstruction detector transceiver.

23. The system set forth in claim 19 wherein:
said obstruction detection unit includes control means responsive to a signal from said base transceiver for changing from a low power consumption mode to a higher power consumption mode for at least one of detecting an obstruction of the path of the barrier and exchanging RF transmissions with at least one of said base transceiver and said remote transceiver.

24. The system set forth in claim 19, wherein said status of said barrier includes one of being in an open position, moving toward an open position, in a closed position, moving toward a closed position, and an obstruction detected.

* * * * *